United States Patent
Pajerski

(12) 
(10) Patent No.: US 6,739,560 B1
(45) Date of Patent: May 25, 2004

(54) SELF-ADJUSTING ANTI-GLIDE APPARATUS

(75) Inventor: Francis L. Pajerski, Elkhorn, WI (US)

(73) Assignee: Palmer-Snyder Furniture Company, Elkhorn, WI (US)

( * ) Notice: Subject to any disclaimer, the term of this patent is extended or adjusted under 35 U.S.C. 154(b) by 0 days.

(21) Appl. No.: 10/365,214

(22) Filed: Feb. 12, 2003

(51) Int. Cl.[7] .............................................. F16M 11/26
(52) U.S. Cl. .............................. 248/188.5; 108/144.11; 248/188.8
(58) Field of Search ........................ 248/188.8, 188.9, 248/188.3, 188.5, 346.11; 108/144.11; 16/42 R

(56) References Cited

U.S. PATENT DOCUMENTS

| | | |
|---|---|---|
| 1,224,156 A | 5/1917 | Ferritto |
| 2,795,892 A * | 6/1957 | Lautenbacher et al. .. 248/188.3 |
| 2,852,883 A * | 9/1958 | Walsh ...................... 248/188.9 |
| 3,183,861 A * | 5/1965 | Halstrick .................... 297/311 |
| 3,258,085 A | 6/1966 | McCarty |
| 3,722,026 A * | 3/1973 | Wilhelmi .................... 16/42 T |
| 3,827,663 A | 8/1974 | Hinman |
| 3,954,241 A | 5/1976 | Carlson |
| 4,068,815 A | 1/1978 | Losert |
| 4,101,164 A | 7/1978 | Urdanoz |
| 4,124,187 A | 11/1978 | Webb |
| 4,130,965 A | 12/1978 | Patton et al. |
| 4,149,762 A | 4/1979 | Olsson et al. |
| 4,192,564 A | 3/1980 | Losert |
| 4,344,645 A | 8/1982 | Kirk |
| 4,798,359 A | 1/1989 | Ball |
| 5,018,692 A | 5/1991 | McGarrah et al. |
| 5,042,765 A | 8/1991 | Widerstrom |
| 5,080,319 A | 1/1992 | Nielsen |
| 5,251,858 A | 10/1993 | Ultee |
| 5,490,648 A | 2/1996 | Cullen |
| 5,492,293 A | 2/1996 | Schaffner |
| 5,680,673 A | 10/1997 | Beshore |
| 6,082,680 A * | 7/2000 | Woodward et al. ......... 248/682 |
| 6,186,591 B1 | 2/2001 | Pajerski |
| 6,196,505 B1 | 3/2001 | Wainwright |
| 6,354,231 B1 | 3/2002 | Morris |

* cited by examiner

Primary Examiner—Ramon O. Ramirez
(74) Attorney, Agent, or Firm—Jansson, Shupe & Munger, Ltd.

(57) ABSTRACT

An anti-glide apparatus for use on an institutional folding table comprising an upper member attached to the table and a lower member slidably disposed with respect to the upper member wherein the lower member is free at all times to infinitely extend and retract between limits so as to allow the lower member to make frictional contact with a supporting surface and the upper member is distinct from any of the table supports. The apparatus is pivotally linked to a center leg support of the table whereby the apparatus is substantially perpendicular to the supporting surface when the table is open and substantially parallel to the top of the table when the table is closed.

20 Claims, 5 Drawing Sheets

SELF-ADJUSTING ANTI-GLIDE APPARATUS

FIELD OF THE INVENTION

This invention is related generally to anti-glide mechanisms for institutional folding tables and, more particularly, to self-adjusting anti-glide mechanisms that is distinct from any of the supports for an institutional folding table.

BACKGROUND OF THE INVENTION

Institutional tables of the type that can be folded for storage and then unfolded for use are commonly found in schools and churches across the country. These tables will often have a table top comprised of two sections hinged together. The supporting structure for many of these tables includes a central leg support and two outer leg supports. Oftentimes the outer leg supports will rest on casters which allows the table to be moved from place to place whether in a folded or erected condition.

Anti-glide devices are structures resembling a post located between the center leg support and either or both of the outer leg supports. Anti-glide devices are intended to provide many of these folding tables with additional points of contact with the floor. They are not intended to be weight supporting and are therefore distinct from leg supports or other structures that are designed to support the table or those sitting at the table when bench or individual seating is attached.

Although the casters on tables such as these are usually furnished with brake locks, such mechanisms have a tendency to wear out or are often ignored by the individuals setting up the table because of the time and inconvenience associated with setting and releasing the locks. The additional contact provided by anti-glide devices is therefore needed to prevent any unintended movement or glide of the table due to the presence of the casters on both outer supports.

On many institutional folding tables, however, manufacturing irregularities will have resulted in the anti-glide devices being constructed with lengths unequal to each other or not equal to that of the center and outer leg supports. As a result, an anti-glide device may either not contact the floor if shorter than the center or outer supports or not permit the center and outer supports themselves from firmly contacting the floor if longer than any of them.

In addition, even when the leg supports and the anti-glide devices are of equal length, similar results as those above will follow should the floor on which the table rests be uneven. A depression in the surface beneath an anti-glide device will give the appearance that the support is too short to make contact with the floor. A rise in the surface beneath an anti-glide device, on the other hand, will suggest that the support is too long and will similarly cause the center and outer supports to be unable to make firm contact with the floor beneath them.

With many institutional folding tables, bench or individual seating is an integral part of the structure. Consequently, another shortcoming in the operation of anti-glide devices occurs when any weight is added to the bench or seats under which an anti-glide device of greater length than each of the supports. In this situation, not only does the anti-glide device prevent full contact by the supports with the supporting surface, but the forces on the device will often leave holes or indentations in the floor covering beneath it or oftentimes result in permanent structural damage to the device itself. This type of damage is aggravated further by any elevation in the surface by a rise or bump in the floor at that point.

This invention addresses such problems and shortcomings in a simple and inexpensive manner.

OBJECTS OF THE INVENTION

It is a primary object of this invention to provide a self-adjusting anti-glide apparatus for use on an institutional folding table that overcomes some of the problems and shortcomings of the prior art, including those mentioned above.

Another object of this invention is to provide an anti-glide apparatus for use on an institutional folding table that automatically adjusts for unevenness in the support surface on which the table rests.

Another object of the invention is to provide a novel anti-glide apparatus for use on an institutional folding table that is self-adjusting for differences between the length of the apparatus with that of similar devices attached to the table or with that of any of the supports for the table.

Another object of the invention is to provide an exceptional anti-glide apparatus for use on an institutional folding table that reduces stress placed on the anti-glide device and on the floor beneath the device during normal operation so as to minimize damage to those structures.

Another object of this invention is to provide a self-adjusting anti-glide apparatus for use on an institutional folding table that permits contact be made with the support surface at all times, irrespective of a certain degree of unevenness in this surface, so as to inhibit any movement by the table across the surface when there are leg supports mounted on casters.

Another object of the invention is to provide an improved anti-glide apparatus that is self-adjusting and yet is simple to manufacture, easy to install and maintain, as well as highly reliable to operate.

SUMMARY OF THE INVENTION

This invention is for an anti-glide apparatus to be used on an institutional folding table of the type having a top in sections and having top supports, the top supports being the only members of the table that support the top sections by extending between the top sections and the supporting surface such as a floor. Moreover, the table is of the type where the top sections are hinged together so that the table can be opened and closed.

The anti-glide apparatus is comprised of an upper member that is attached to the table, where the upper member has a central axis and is distinct from any of the top supports, and of a lower member that is connected to the upper member in a fashion where it is free at all times to slidably extend and retract within limits in a direction parallel with the axis of the upper member. This freedom of movement allows the lower member to make frictional contact with the supporting surface for the table.

In one preferred embodiment, the upper member and lower member of the anti-glide apparatus are tubular, with the upper member slidably disposed within the lower member in a telescoping relationship. In such an embodiment, the lower member is secured to the upper member by a fastener that is inserted through a fastener-aperture on the lower member and a fastener-slot on the upper member. As a result of this mode of attachment, the limits of extension and retraction for the lower member will be the length of the fastener-slot.

In certain preferred forms of this embodiment, the anti-glide apparatus is further comprised of a spring member mounted within the lower member. This feature is adapted to bias the lower member in a downward direction. One highly preferred form of this embodiment uses a coil spring for the spring member, the coil spring being engaged to a base of the upper member at one of its ends and to a base of the lower member at its opposite end. It is also highly preferred that the spring member consist of a plurality of spring washers or be made from polyurethane.

In an alternative embodiment that is most preferred, the anti-glide apparatus is further comprised of a spring member that is mounted around the outside of the upper member. The spring member is mounted to the upper member in a fashion that biases the lower member in a downward direction.

In certain preferred embodiments of this invention, the upper member and lower member remain tubular but the lower member is slidably disposed within the upper member in a telescoping relationship. In such an embodiment, the upper member is secured to the lower member by a fastener that is inserted through a fastener-aperture on the upper member and a fastener-slot on the lower member. The limits of extension and retraction for the lower member in this form of the apparatus will be the length of the fastener-slot. It is highly preferred in this embodiment for the apparatus to also include a spring member that is mounted within the upper member to bias the lower member in a downward direction.

In another highly preferred embodiment, the upper member is disposed adjacent to the lower member. In such an embodiment, the upper member is secured to the lower member by a fastener that is inserted through a fastener-slot on the lower member and a fastener-aperture on the upper member. The limits of extension and retraction for the lower member in this form of the apparatus will also be the length of the fastener-slot. It is most preferred in this embodiment of the invention that apparatus further comprise a spring member that is mounted around the outside of the upper member. This spring member is adapted to bias the lower member in a downward direction.

One most preferred embodiment of the present invention finds that the top supports of the table include a center leg support and that this support is pivotally linked to the upper member. This mechanism insures that the anti-glide apparatus is pointing substantially downward toward the floor when the table is opened and is substantially parallel to the top sections when the table is closed. Another highly preferred embodiment finds the present invention adapted for use on an institutional folding table having top supports that include at least two outer leg supports resting on casters.

In another aspect of this invention, it is an improvement to an institutional folding table of the type having a pair of top sections, top supports for supporting the top sections, and at least one non-supporting anti-glide apparatus, wherein the anti-glide apparatus is self-adjusting. In one highly preferred embodiment, the apparatus is comprised of an upper member and a lower member where the lower member is slidably disposed with respect to the upper member so that it is free at all times to infinitely extend and retract within limits. This freedom of movement allows the lower member to make frictional contact with a supporting surface for the table.

A most preferred embodiment has the upper member slidably disposed within the lower member. In such an embodiment, the lower member is secured to the upper member by a fastener that is inserted through a fastener-aperture on the lower member and a fastener-slot on the upper member. As a result, the limit of extension and retraction for the lower member is the length of the fastener-slot. Moreover, this embodiment of the apparatus includes a spring member mounted within the lower member to bias the lower member in a downward direction.

DETAILED DESCRIPTION OF PREFERRED EMBODIMENTS

Figure 1:
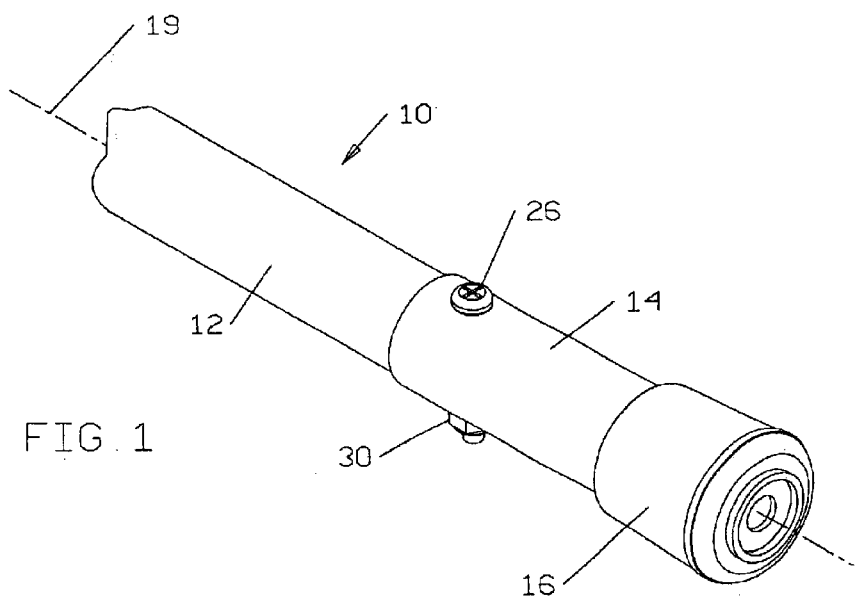
FIG. 1 is a perspective view of a preferred self-adjusting anti-glide apparatus in accordance with this invention.

The drawings illustrate an anti-glide apparatus 10 for use on an institutional folding table 11 in accordance with this invention. One preferred embodiment is particularly shown in FIGS. 1 and 2.

Figure 2:
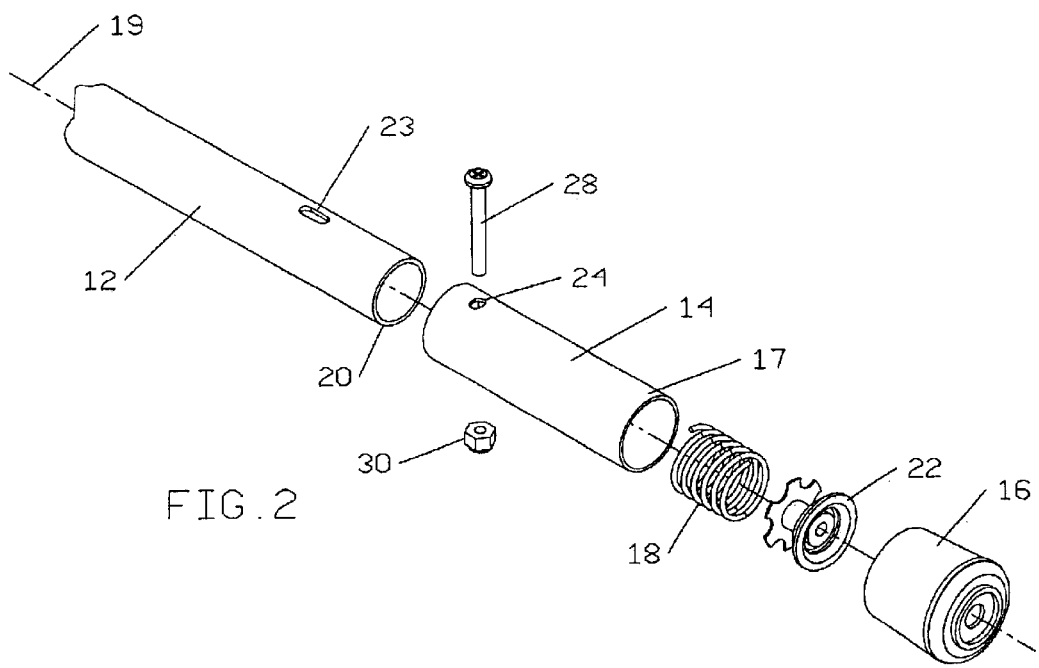
FIG. 2 is an exploded view of the apparatus of FIG. 1.

As illustrated in FIG. 2, anti-glide apparatus 10 is comprised of an upper member 12 and a lower member 14. Both members 12, 14 are tubular structures, preferably cylindrical, so as to allow upper member 12 to be telescopically disposed within lower member 14. An end cap 16 covers the lower member-bottom end 17 of lower member 14. End cap 16 can be attached to lower member 14 by being glued on, screwed in or similar suitable method.

An interior compression spring 18 is received within lower member 14 and positioned between the upper member-bottom edge 20 and a spring stop 22 mounted within lower member-bottom end 17. When under compression, interior compression spring 18 is biased to move lower member 14 in a direction away from upper member 12. Any movement of lower member 14 with respect to upper member 12 is in a direction parallel with the central axis 19 of upper member 12.

To attach members 12, 14 together, upper member 12 is provided with a pair of fastener-slots 23 and lower member 14 has two fastener-apertures 24. Each fastener-slot 23 is opposite the other along a diameter of upper member 12. Similarly, each fastener-aperture 24 is in registry with the other along a diameter of lower member 14.

Fastener-slots 23 are placed in alignment with fastener-apertures 24 and each fastener-slot 23 and fastener-aperture 24 is sized so that a fastener 26 can be inserted through both fastener-apertures 24 and both fastener-slots 23 to slidably secure lower member 14 to upper member 12. Preferably, fastener 26 is a combination of a bolt 28 and lock nut 30.

Figure 3A:
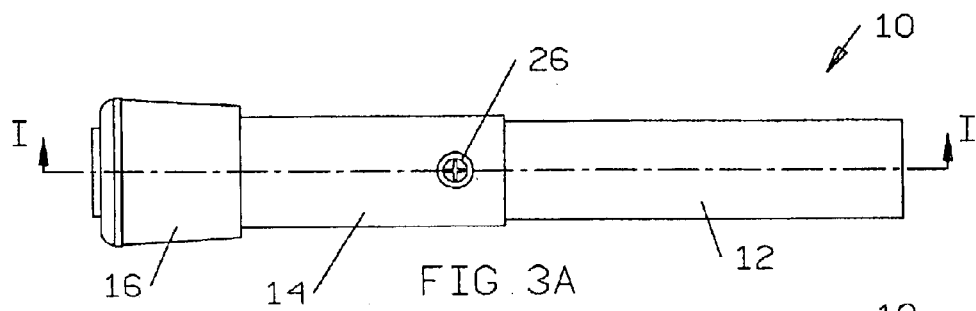
FIG. 3A is a top view of the apparatus of FIG. 1.
Figure 3B:
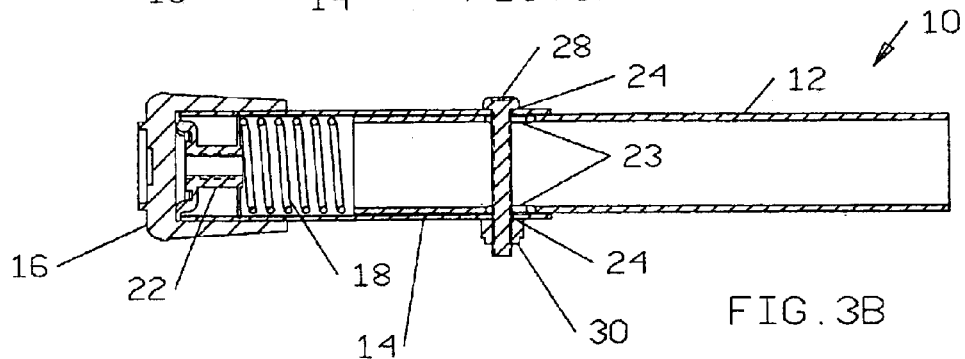
FIG. 3B is a cross-sectional taken substantially on the line I—I of FIG. 3A having an interior compression spring.
Figure 3C:
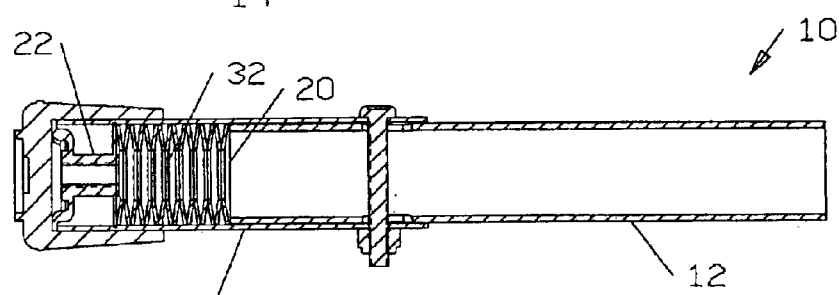
FIG. 3C is a cross-sectional taken substantially on the line I—I of FIG. 3A having spring washers.

As illustrated in FIGS. 3A–3E, other preferred embodiments in accordance with this invention allow different spring members to be substituted for interior compression spring 18 (FIG. 3B). One such embodiment is shown in FIG. 3C where a series of spring washers 32 are stacked between spring stop 22 and upper member-bottom edge 20 within lower member 14.

Figure 3D:
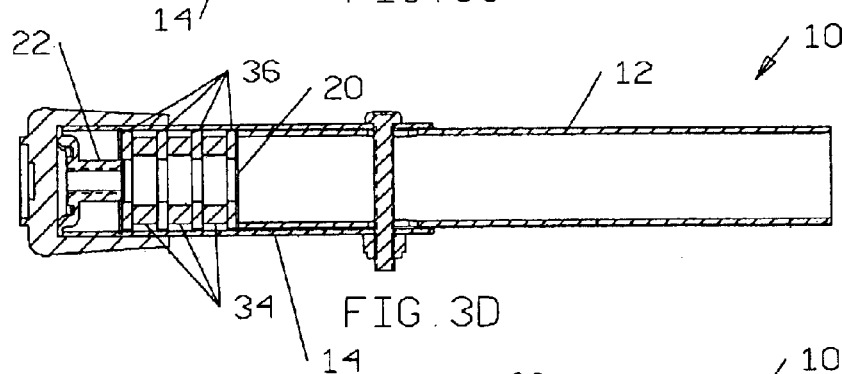
FIG. 3D is a cross-sectional taken substantially on the line I—I of FIG. 3A having polyurethane flat disk springs.
Figure 3E:
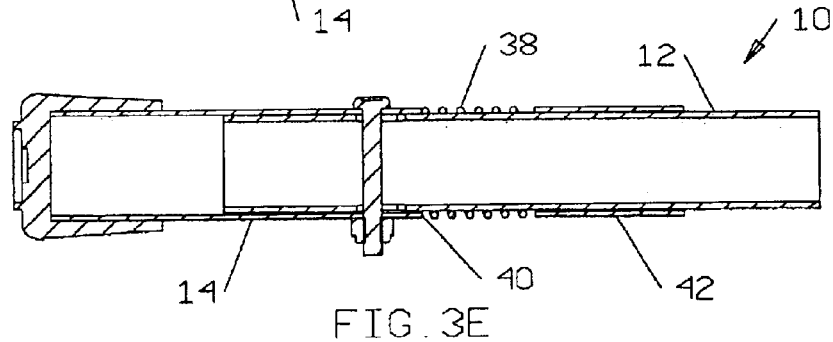
FIG. 3E is a cross-sectional taken substantially on the line I—I of FIG. 3A having an exterior compression spring.

Another embodiment, as illustrated in FIG. 3D, has a spring member that is comprised of polyurethane disks 34 alternating with rigid washers 36. Also preferred, FIG. 3E shows positioning an exterior compression spring 38 between the lower member-top edge 40 and a spring stop collar 42 around the outside of upper member 12.

Figure 4:
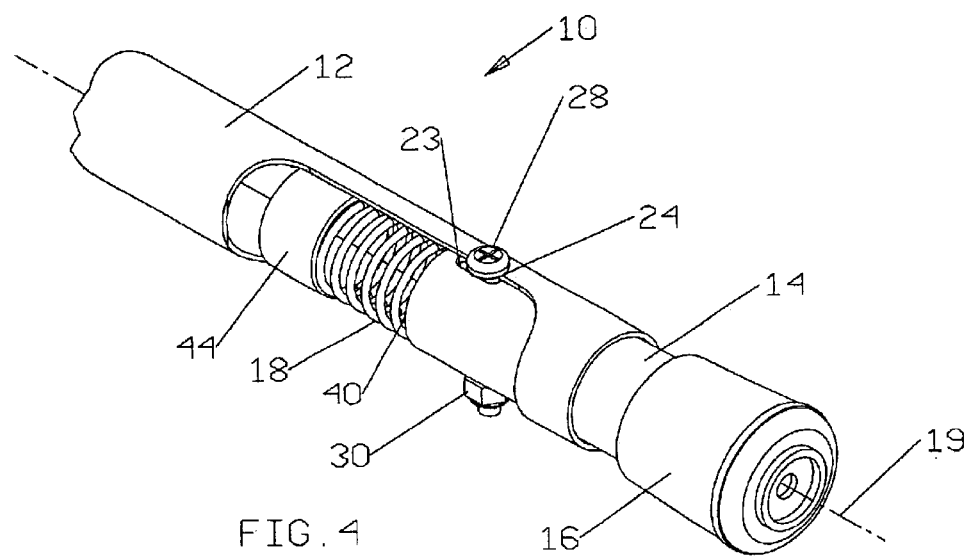
FIG. 4 is a perspective view of another preferred self-adjusting anti-glide apparatus in accordance with this invention having the lower member disposed within the upper member with a partial cut-out of the upper member.

In another alternative aspect of this invention shown in FIG. 4, lower member 14 is received by upper member 12. In this embodiment, lower member 14 is provided with a pair of fastener-slots 23 that are opposite each other along a diameter of lower member 14. Two fastener-apertures 24 are formed in upper member 12, each fastener-aperture 24 in alignment with the other along a diameter of upper member 12. Bolt 28 can then be inserted through both fastener-apertures 24 and both fastener-slots 23 before being fastened in place by lock nut 30, thereby slidably securing upper member 12 to lower member 14. (Only one fastener-slot 23 and one fastener-aperture 24 are shown.)

Interior compression spring 18 is positioned within upper member 12 above the location of bolt 28. Interior compression spring 18 is secured between the lower member-top edge 40 and a spring retainer 44 attached within upper member 12 at a distance relative to lower member-top edge 40 that is consistent with the size of interior compression spring 18. As in all embodiments of this invention, fastener-slot 23 determines the extent to which lower member 14 can extend or retract relative to upper member 12.

Figure 5:
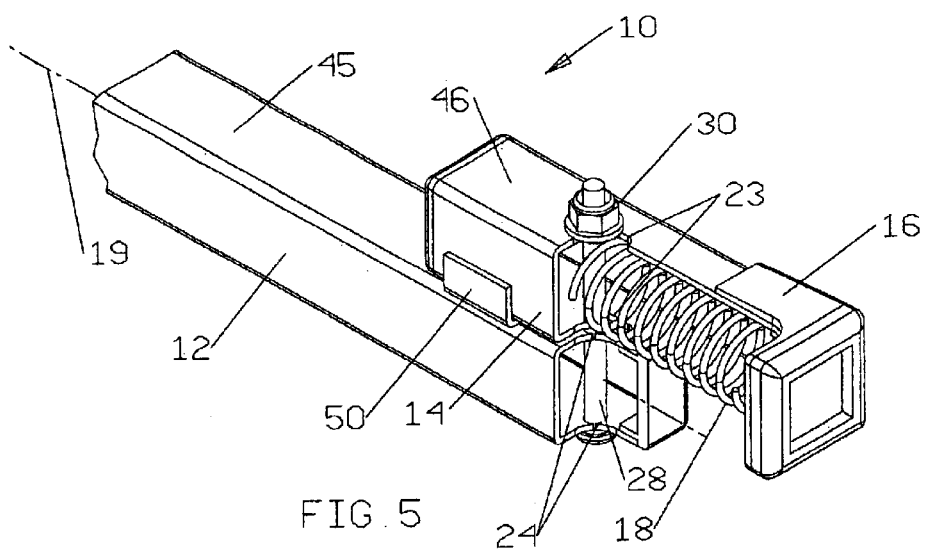
FIG. 5 is a perspective view of another preferred self-adjusting anti-glide apparatus in accordance with this invention having the lower member disposed adjacent to the upper member with a partial cut-out of the upper and lower members.

As seen in FIG. 5, members 12, 14 can alternatively be hollow square tubular structures disposed adjacent to each other. In this embodiment, upper member 12 is provided with a pair of fastener-apertures 24. Each fastener-aperture 24 is located along a line perpendicular to upper member-surface 45 and to the central axis 19. Lower member 14 is provided with two fastener-slots 23 that are similarly opposite each other along a line perpendicular to lower member surface 46.

Lower member 14 is positioned over upper member-surface 45 so that fastener-slots 23 are in registry with fastener-apertures 24. After proper alignment, bolt 28 is inserted first through fastener-apertures 24 on the upper member 12 and then through fastener-slots 23 on the lower member 14. Bolt 28 is secured in place with lock nut 30 in a manner that fastens upper member 12 to lower member 14 and also allows lower member 14 to slidably extend and retract.

Interior compression spring 18 is mounted between end cap 16 and bolt 28. A guide bracket 50 is rigidly attached to upper member-surface 45, whereby guide bracket 50 directs movement of lower member 14 in an axial direction contiguous with upper member-surface 45.

Figure 6:
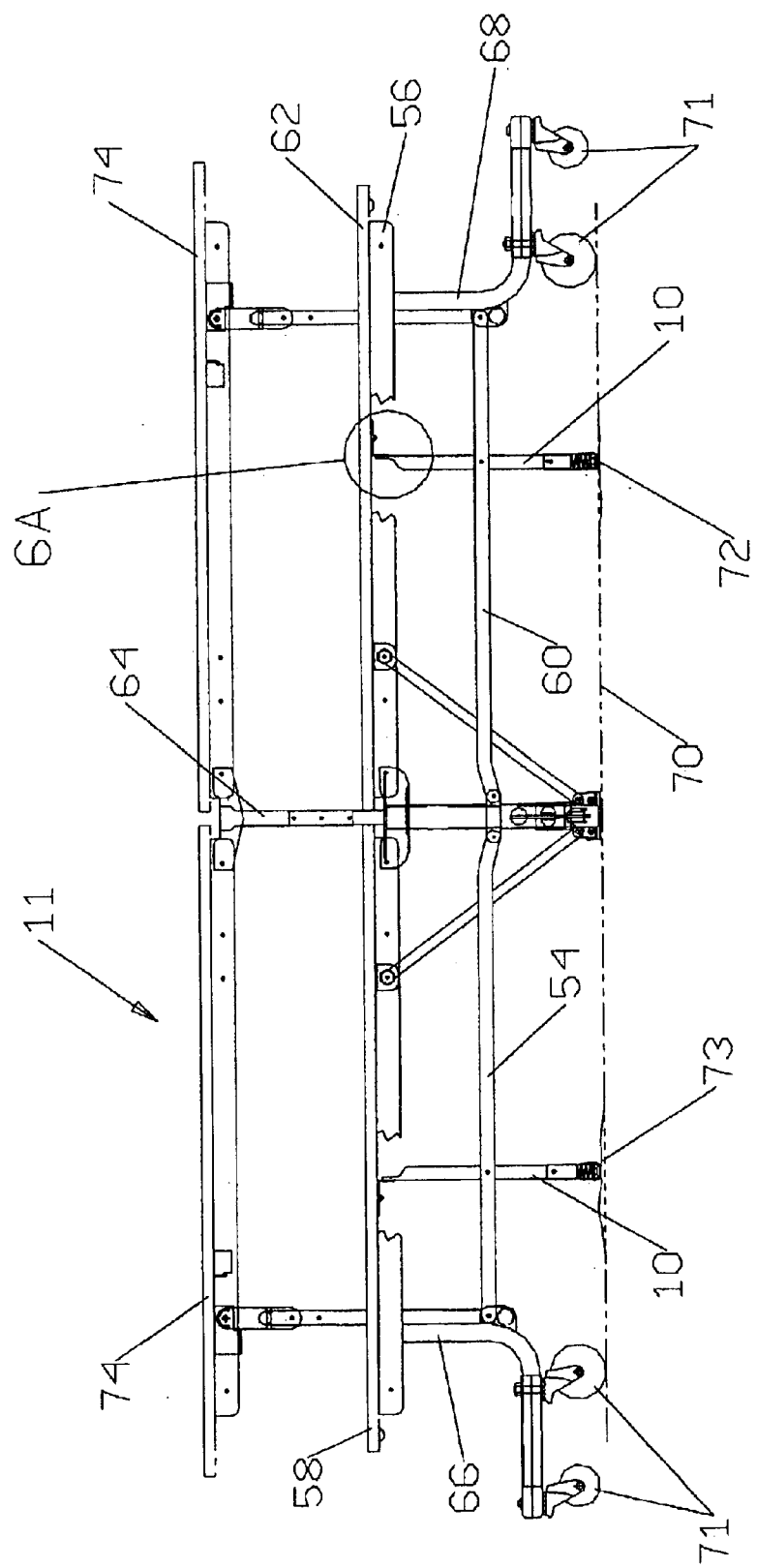
FIG. 6 is a front view of an institutional folding table in an unfolded configuration with a partial cut-out of the apron.
Figure 6A:
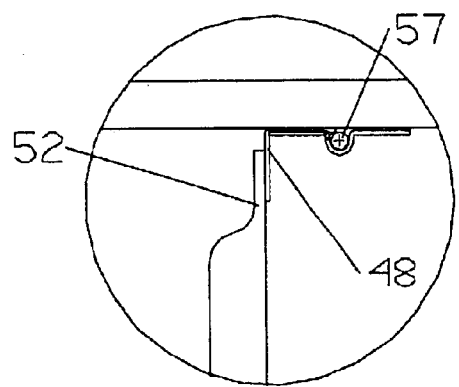
FIG. 6A is a detailed view of area 6A in FIG. 6.

As seen in FIG. 6, anti-glide apparatus 10 is mounted on table 11 through pivotal attachments to both a first horizontal stretcher bar 54 and to the apron 56 beneath a first bench section 58. The upper member-upper end 52 is preferably flattened to allow for a rigid attachment of anti-glide apparatus 10 to an angle bracket 48. Angle bracket 48 is pivotally attached to apron 56 by a pivot pin 57.

Another anti-glide apparatus 10 is shown similarly attached to a second horizontal stretcher bar 60 and second bench section 62. In this fashion, one can see that an institutional folding table 11 can preferably be provided with as many as four anti-glide devices in accordance with this invention.

Table 11 has a center leg support 64 and first and second outer leg support 66, 68. These supports 64, 66, 68 are weight-supporting and are intended to support top sections 74 and all who are sitting on the four bench sections attached. (Only bench sections 58, 62 are shown).

Figure 7:
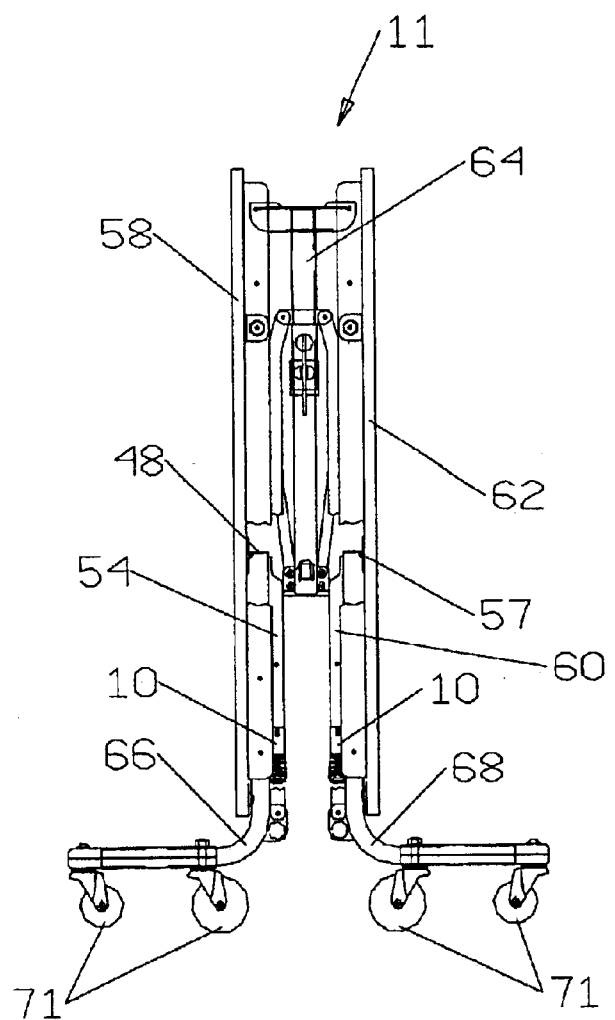
FIG. 7 is a side view of the institutional folding table of FIG. 6 in a folded configuration with a partial cut-out of the first and second horizontal stretcher bars and of the apron.

First horizontal stretcher bar 54 is pivotally attached at one end to center leg support 64 and pivotally attached at the other end to first outer leg support 66. As will be recognized by those skilled in the art, anti-glide apparatus 10 will be deployed in a desired vertical orientation when table 11 is in an unfolded or open position. Upon folding or closing table 11, the pivotal attachments between apparatus 10 and stretcher support 64 and first outer leg support 66 will cause apparatus 10 to pivot towards outer leg support 66. As seen in FIG. 7, this interaction results in anti-glide apparatus 10 remaining in a vertical orientation alongside first bench section 58 when table 11 has been substantially folded.

In operation, as illustrated in FIG. 6, anti-glide apparatus 10 is able to make contact with the surface 70 supporting table 11 despite a degree of unevenness in surface 70. By action of interior compression spring 18, lower member 14 extends outward to place end cap 16 in frictional contact with surface 70 over a depression 72. Above a rise 73 in the surface 70, lower member 14 retracts in relation to upper member 12 so as to maintain frictional contact between end cap 16 and surface 70 without damage to apparatus 10 or surface 70. End cap 16 is preferably made from a suitable frictional material such as rubber.

Since outer leg supports 66, 68 will typically rest on casters 71 so as to allow table 11 to be easily moved whether table 11 be in a folded or unfolded condition, such adjustability on the part of anti-glide apparatus 10 to adapt to irregularities in supporting surface 70 provides table 11 with an additional point of contact with surface 70 so as to prevent any unintended movement or glide by table 11.

While any extension and retraction of lower member 14 is limited by the length of fastener-slot 23, it will be recognized that fastener-slot 23 can be sized to reflect the degree of unevenness that may be anticipated in surface 70 on which table 11 is to be erected for use in the future.

Thus, it should be apparent that there has been provided, in accordance with the present invention, a novel device for efficiently and effectively providing anti-glide points of contact on an institutional folding table that is self-adjusting and fully satisfies the objectives and advantages set forth above.

The various parts shown in the drawings and described above may be fabricated using a variety of materials and a variety of assembly procedures known to those skilled in the art. Moreover, it will be apparent to one skilled in the art that a self-adjusting anti-glide apparatus in accordance with this invention will preferably be made from materials selected to be sufficient to withstand the forces anticipated to be applied to it. The choice of material will therefore depend on the particular application being made of the anti-glide apparatus.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. An anti-glide apparatus adapted for use on an institutional folding table having top sections and having outer and center leg supports of a fixed length, the leg supports being the only members supporting the top sections and extending between the top sections and a support surface, and wherein the top sections are hinged together for movement of the table between open and closed positions, the apparatus comprising:
   an upper member attached with respect to the table at a position between at least two leg supports, the upper member having a central axis and wherein the upper member is distinct from any of the leg supports; and
   a lower member slidably disposed with respect to the upper member, the lower member being free at all times to infinitely extend and retract between limits in a direction parallel with the axis so as to allow the lower member to make frictional contact with the support surface.

2. The apparatus of claim 1 wherein:
   the upper member is disposed within the lower member and has a fastener-slot that has a length;
   the lower member has a fastener-aperture; and
   the lower member is secured to the upper member by a fastener inserted through the fastener-aperture and fastener-slot,
whereby the limits of extension and retraction for the lower member are established by the length of the fastener-slot.

3. The apparatus of claim 2 further comprising a spring member mounted within the lower member to bias the lower member in a downward direction.

4. The apparatus of claim 3 wherein the spring member is a compression spring.

5. The apparatus of claim 3 wherein the bring member is a plurality of spring washers.

6. The apparatus of claim 3 wherein the spring member is made from polyurethane.

7. The apparatus of claim 2 further comprising a spring member mounted around the upper member to bias the lower member in a downward direction.

8. The apparatus of claim 1 wherein:
   the lower member is disposed within the upper member and has a fastener-slot that has a length;
   the upper member has a fastener-aperture; and
   the lower member is secured to the upper member by a fastener inserted through the fastener-aperture and fastener-slot,
whereby the limits of extension and retraction for the lower member are established by the length of the fastener-slot.

9. The apparatus of claim 8 further comprising a spring member mounted within the upper member to bias the lower member in a downward direction.

10. The apparatus of claim 1 wherein:
    the upper member is disposed adjacent to the lower member and has a fastener-aperture;
    the lower member has a fastener-slot that has a length; and
    the lower member is secured to the upper member by a fastener inserted through the fastener-slot and fastener-aperture,
whereby the limits of extension and retraction for the lower member are established by the length of the fastener-slot.

11. The apparatus of claim 10 further comprising a spring member mounted around the upper member to bias the lower member in a downward direction.

12. The apparatus of claim 1 wherein the upper member is pivotally linked to the center leg support whereby the apparatus is substantially perpendicular to the support surface when the table is in the open position and the apparatus is substantially parallel to the top sections when the table is in the closed position.

13. The apparatus of claim 12 wherein:
    the upper member is disposed within the lower member and has a fastener-slot that has a length;
    the lower member has a fastener-aperture; and
    the lower member is secured to the upper member by a fastener inserted trough the fastener-aperture and fastener-slot,
whereby the limits of extension and retraction for the lower member are established by the length of the fastener-slot.

14. The apparatus of claim 13 further comprising a spring member mounted within the lower member to bias the lower member in a downward direction.

15. The apparatus of claim 1 wherein the top supports include at least two outer leg supports, the outer leg supports having casters that are resting on the support surface.

16. The apparatus of claim 15 wherein:
    the upper member is disposed within the lower member and has a fastener-slot that has a length;
    the lower member has a fastener-aperture; and
    the lower member is secured to the upper member by a fastener inserted through the fastener-aperture and fastener-slot,
    whereby the limits of extension and retraction for the lower member are established by the length of the fastener-slot.

17. The apparatus of claim 16 further comprising a spring member mounted within the lower member to bias the lower member in a downward direction.

18. In an institutional folding table of the type having a pair of top sections, leg supports with a fixed length for supporting the top sections, and at least one anti-glide apparatus, the improvement wherein the anti-glide apparatus is self-adjusting and distinct from any of the leg supports.

19. The table of claim 18 wherein the anti-glide apparatus comprises:
    an upper member attached with respect to the table at a position between at least two leg support;
    a lower member slidably disposed with respect to the upper member, the lower member being free at all times to infinitely extend and retract between limits so as to allow the apparatus to make frictional contact with a support surface.

20. The table of claim 19 wherein:
    the upper member is disposed within the lower member and has a fastener-slot that has a length;
    the lower member has a fastener-aperture;
    the lower member is secured to the upper member by a fastener inserted through the fastener-aperture and fastener-slot; and
    a spring member is mounted within the lower member to bias the lower member in a downward direction,
whereby the limits of extension and retraction for the lower member are established by the length of the fastener-slot.

* * * * *

UNITED STATES PATENT AND TRADEMARK OFFICE
CERTIFICATE OF CORRECTION

PATENT NO. : 6,739,560 B1
DATED : May 25, 2004
INVENTOR(S) : Francis L. Pajerski It is certified that error appears in the above-identified patent and that said Letters Patent is hereby corrected as shown below:

Column 6,
Line 22, after "apparatus 10 and", insert -- bar 54 and the pivotal attachments in turn between stretcher bar 54 and center leg --.

Column 8,
Line 24, after "wherein the" delete "top" and insert -- leg --.
Line 48, delete "support" and insert -- supports --.

Signed and Sealed this

Ninth Day of November, 2004

JON W. DUDAS
*Director of the United States Patent and Trademark Office*